US012207206B2

(12) United States Patent
Zhang et al.

(10) Patent No.: US 12,207,206 B2
(45) Date of Patent: Jan. 21, 2025

(54) TECHNIQUES FOR REDUCING RESOURCE USAGE FOR DUAL SUBSCRIPTION DUAL ACTIVE WIRELESS COMMUNICATIONS

(71) Applicant: QUALCOMM Incorporated, San Diego, CA (US)

(72) Inventors: Nan Zhang, San Diego, CA (US); Chetan Jagdeesh Bharadwaj, Erie, CO (US); Kiran Patil, San Diego, CA (US); Qi Huang, San Diego, CA (US); Sagar Kakade, San Diego, CA (US); Xiaojian Long, San Diego, CA (US); Cheol Hee Park, San Diego, CA (US); Zhengming Li, San Diego, CA (US); Saurabh Chum, Longmont, CO (US); Qingxin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/690,253

(22) Filed: Mar. 9, 2022

(65) Prior Publication Data

US 2023/0292258 A1    Sep. 14, 2023

(51) Int. Cl.
*H04W 52/36* (2009.01)

(52) U.S. Cl.
CPC .................. *H04W 52/365* (2013.01)

(58) Field of Classification Search
CPC .................................................. H04W 52/365
See application file for complete search history.

(56) References Cited

U.S. PATENT DOCUMENTS

| 9,775,082 B1 | 9/2017 | Chakraborty et al. |
| 10,623,946 B1 | 4/2020 | Kumar et al. |
| 2019/0174449 A1* | 6/2019 | Shan ............ H04W 60/04 |

OTHER PUBLICATIONS

International Search Report and Written Opinion—PCT/US2023/060609—ISA/EPO—May 10, 2023.
Samsung: "FS_MUSIM 22834 P-CR: Definitions", 3GPP TSG-SA WG1 Meeting #86, 3GPP Draft, S1-191570-WAS1291-WAS1029-FS_MUSI_22834_PCR_DEFINITIONS, 3rd Generation Partnership Project (3GPP), Mobile Competence Centre, 650, Route Des Lucioles, F-06921 Sophia-Antipolis Cedex, France, vol. SA WG1, No. Suzhou, China, May 6, 2019-May 10, 2019, 2 Pages, May 13, 2019 (May 13, 2019), XP051743732, the whole document.
VIVO: "Enhanced Support for Multi-SIM Devices in Rel-18", 3GPP TSG RAN Rel-18 Workshop, 3GPP Draft, RWS-210176, 3rd Generation Partnership Project (3GPP), Mobile Competence Centre, 650, Route Des Lucioles, F-06921 Sophia-Antipolis Cedex, France, vol. TSG RAN, No. Electronic Meeting, Jun. 28, 2021-Jul. 2, 2021, 6 Pages, Jun. 7, 2021 (Jun. 7, 2021), XP052025735, the whole document.

* cited by examiner

*Primary Examiner* — Hsinchun Liao
(74) *Attorney, Agent, or Firm* — ArentFox Schiff LLP

(57) ABSTRACT

Aspects described herein relate to configuring a primary component carrier (PCC) and at least one secondary component carrier (SCC) for transmitting uplink communications to one or more nodes of a wireless network using carrier aggregation (CA) in a first subscription of the UE, and transmitting, to at least one of the one or more nodes, a manipulated power headroom report for the at least one SCC based on a migration from an idle state to an active state in a second subscription of the UE.

26 Claims, 6 Drawing Sheets

TECHNIQUES FOR REDUCING RESOURCE USAGE FOR DUAL SUBSCRIPTION DUAL ACTIVE WIRELESS COMMUNICATIONS

BACKGROUND

Aspects of the present disclosure relate generally to wireless communication systems, and more particularly, to wireless communications by devices using multiple subscriptions.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, devices, including user equipment (UE), can use multiple subscriptions (e.g., based on multiple subscriber identity modules (SIMs) connected to or otherwise usable the UE) to communicate with one or more cells. A UE can communicate in a dual subscription dual standby (DSDS) mode, where the UE can communicate (e.g., in connected state) using a first subscription (e.g., first SIM) while being in standby (e.g., in idle or inactive state) on a second subscription (e.g., second SIM). A UE can communicate in dual subscription dual active (DSDA) mode where the UE can simultaneously transmit and receive using both subscriptions (e.g., both SIMs), namely both subscriptions can be in radio resource control (RRC) CONNECTED state.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication at a user equipment (UE) is provided that includes configuring a primary component carrier (PCC) and at least one secondary component carrier (SCC) for transmitting uplink communications to one or more nodes of a wireless network using carrier aggregation (CA) in a first subscription of the UE, and transmitting, to at least one of the one or more nodes, a manipulated power headroom report for the at least one SCC based on a migration from an idle state to an active state in a second subscription of the UE.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
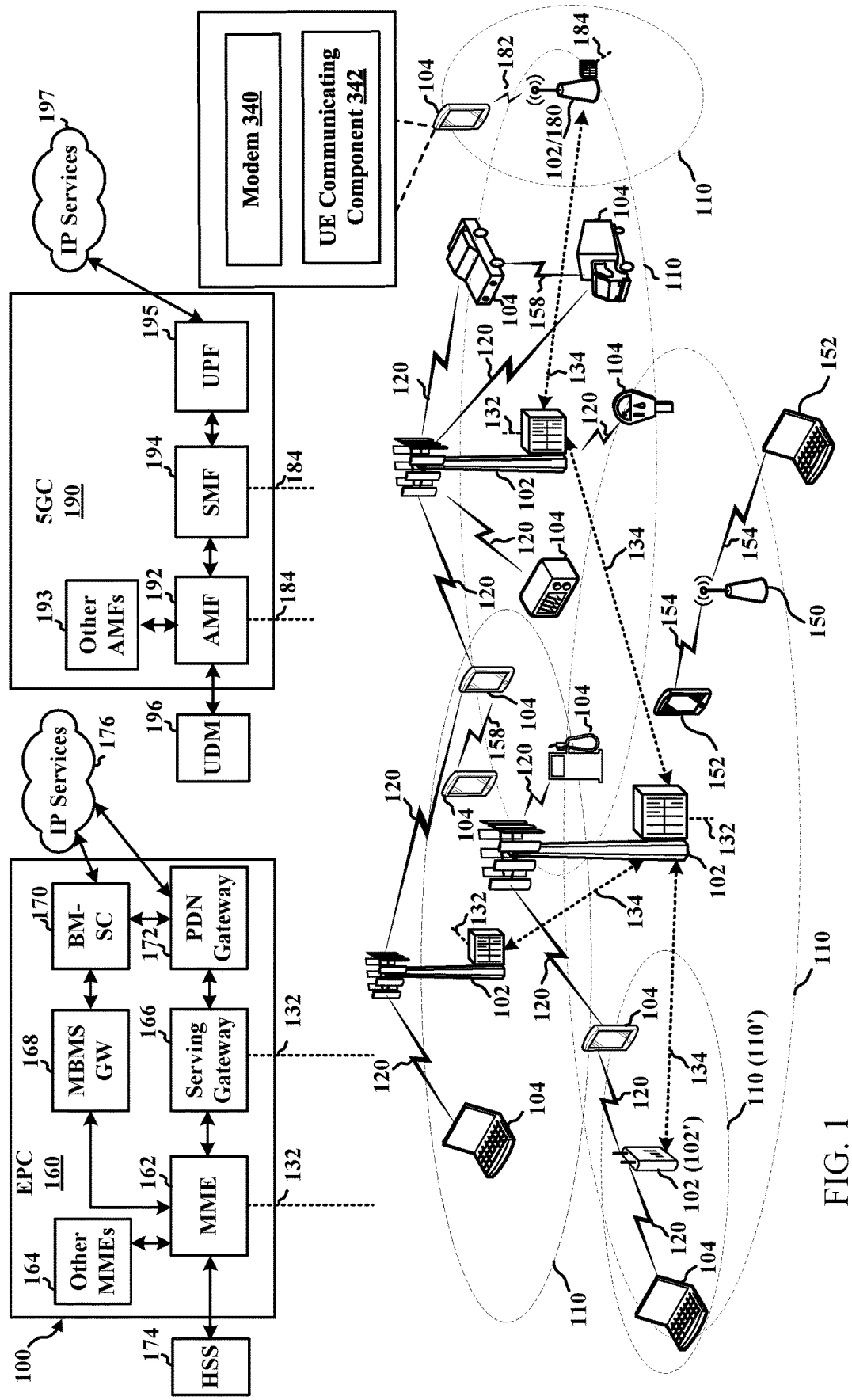
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to transitioning a device between dual subscription dual standby (DSDS) mode and dual subscription dual active (DSDA) mode in wireless communication with one or more network nodes. In DSDS mode, for example, the device can communicate (e.g., in connected state) using a first subscription while being in standby (e.g., in idle or inactive state) on a second subscription. In DSDA mode, the device can communicate in dual subscription dual active (DSDA) mode where the UE can simultaneously transmit and receive using both subscriptions. In DSDA mode for fifth generation (5G) new radio (NR), in this regard, both subscriptions can be in radio resource control (RRC) CONNECTED state. In addition, in an example, each subscription in the device can have a corresponding subscriber identity module (SIM), which can provide subscription information for communicating (e.g., cellular or other wireless communications) with one or more network nodes using the given subscription. In one example, the device can communicate using dual SIMs, where the SIMs can be internal to the device and/or on SIM cards inserted into a port or interface of the device.

In some wireless communication technologies, such as long term evolution (LTE), the device can communicate (e.g., concurrently) with one or more network nodes using multiple component carriers (CCs) in carrier aggregation (CA)—specifically, uplink CA in LTE can support two CCs including a primary CC (PCC) and a secondary CC (SCC). In addition, in some wireless communication technologies, a maximum number of CCs can be supported for DSDA. For example, for NR and LTE DSDA, uplink (UL) CA may not be supported. In this regard, for example, where a user equipment (UE) is communicating over LTE using ULCA over multiple CCs in DSDS or other mode where only one subscription is active at a time, when the UE switches to DSDA, the UE can remove or deactivate/de-configure one or more CCs over LTE (e.g., the LTE SCC UL resources). In LTE, the downlink (DL) may still support multiple CCs in DSDA.

In an example, forcefully removing SCC UL resources at the UE may introduce undesired traffic interrupt at the UL. In addition, it may impact DL at the UE as well, as under some scenarios, channel state information (CSI), acknowledgement/negative-acknowledgement (A/N) or other feedback can be carried by SCC (e.g., in a physical uplink shared channel (PUSCH) over the SCC). Thus, removing SCC UL can impact DL performance as well in certain scenarios.

Aspects described herein relate to smoothing transition from DSDS to DSDA mode, or otherwise from modes allowing a first number of CCs to modes allowing a second number of CCs less than the first number of CCs, using a power headroom report (PHR). For example, a UE can configure multiple CCs for communicating with a network node using a first subscription, such as a PCC and one or more SCCs. Based on an indication of a migration from idle mode to active mode in a second subscription (e.g., to enter DSDA mode), the UE can send a manipulated PHR for the one or more SCCs in an attempt to have the network node refrain from granting uplink resources for the UE over the one or more SCCs (and/or shift any UL traffic to the PCC). In an example, when the UE transfers to DSDA mode, the UE can deactivate at least an uplink portion of the one or more SCCs (also referred to herein as a UL SCC). In another example, if the UE cannot stay in DSDA mode (e.g., due to NR RACH failure for entering DSDA mode) or if the transition to DSDA mode is for a short period of time, the UE may send a normal PHR for the SCC (or otherwise terminate manipulation of the PHR) in an attempt to revive communications over the SCC.

Sending the manipulated PHR for the one or more SCCs during the period of time where the indicate of the migration is detected until the UE actually switches to DSDA mode can allow for smoother deactivation of a UL SCC when transitioning to DSDA mode. This can allow the network to shift UL traffic from the SCC to the PCC during this time before the UL SCC is deactivated. This can improve UL throughput at the UE during this time, and facilitate desired configuration of the UE by the network. This can also improve channel state or other feedback reporting, which can provide improved device efficiency, power consumption, avoid service interruption, and/or improve user experience in wireless communications using such devices and/or networks.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for switching between standby and active multiple subscription modes and accordingly modifying CC configurations, in accordance with aspects described herein. Though a UE 104 is shown as having the modem 340 and UE communicating component 342, this is one illustrative example, and substantially any node or type of node may include a modem 340 and UE communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, a UE 104 can communicate using multiple subscriptions in either a multiple subscription standby mode (e.g., DSDS) or a multiple subscription active mode (e.g., DSDA). Based on switching between modes, UE communicating component 342 can modify a CC configuration. In an example, as part of or before modifying the CC configuration, UE communicating component 342 can manipulate PHRs sent for one or more CCs in an attempt to have the network node switch traffic from one CC to another. For example, where switching from DSDS mode to DSDA mode may cause a UL SCC to be deactivated, UE communicating component 342 can manipulate a PHR transmitted for the SCC to allow the network node an opportunity to move UL traffic to another CC (e.g., a PCC) before the UL SCC is deactivated as part of switching to DSDA mode.

Figure 2:
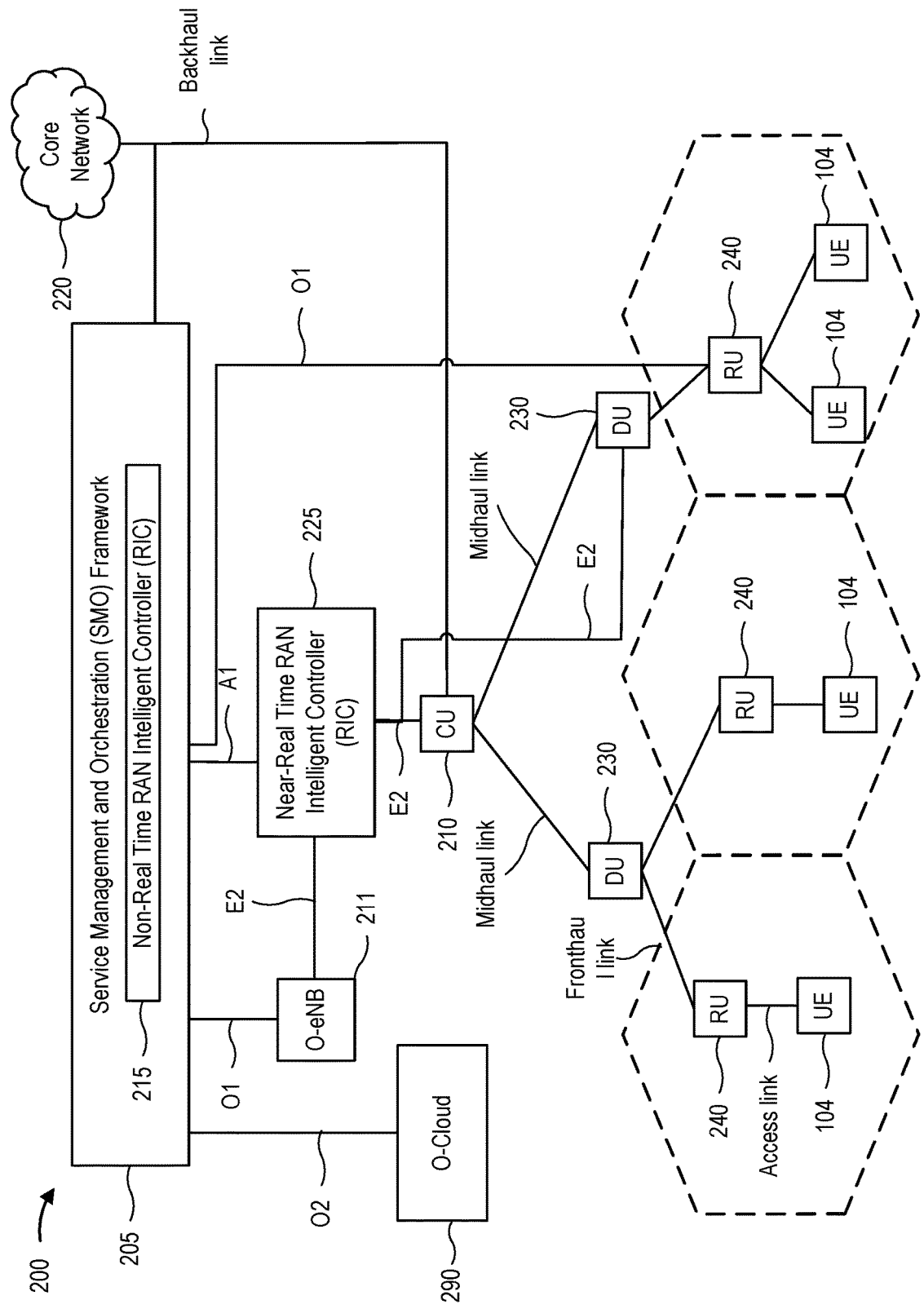
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as AI policies).

Figure 3:
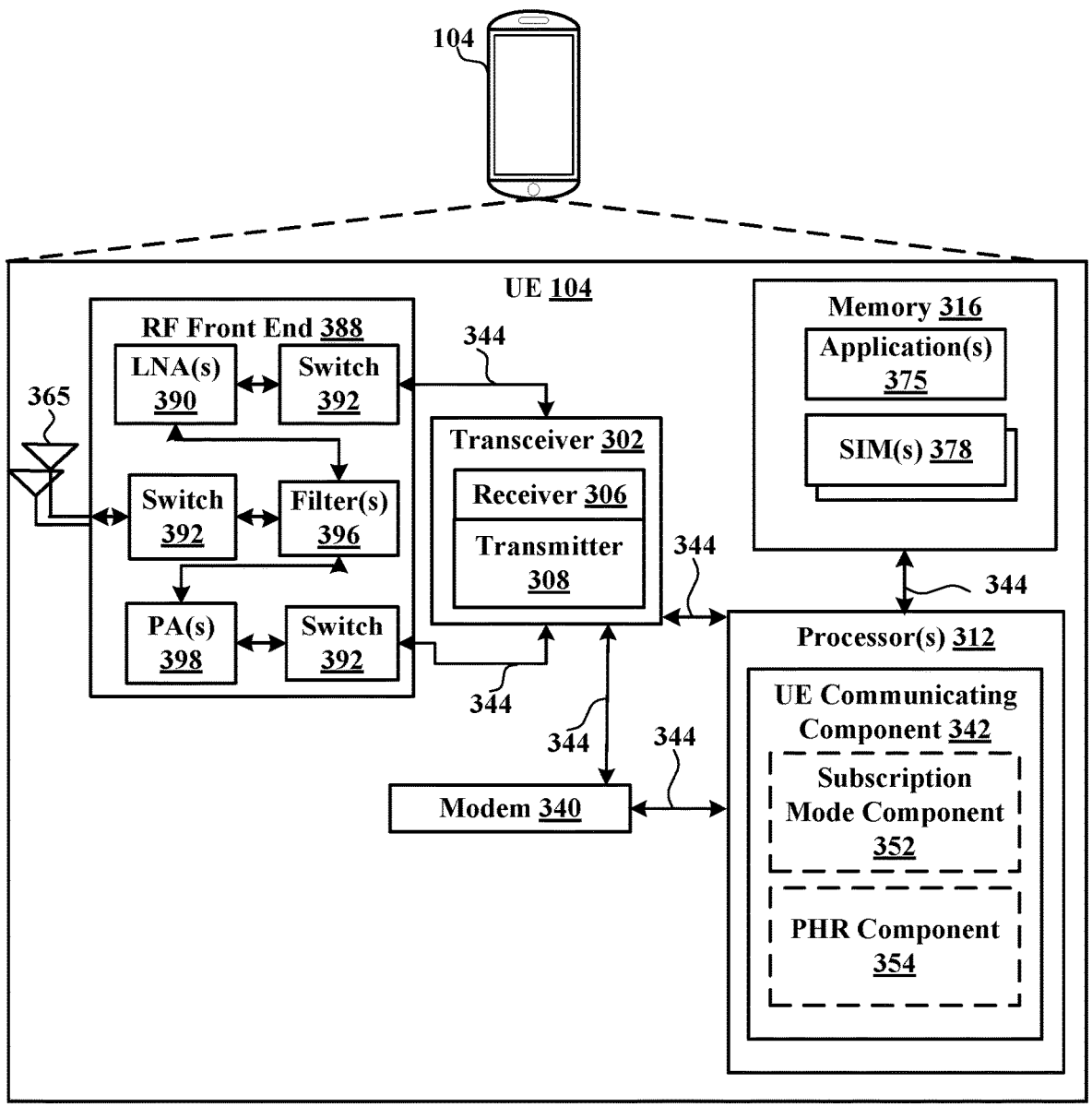
FIG. 3 is a block diagram illustrating an example of a user equipment (UE), in accordance with various aspects of the present disclosure.
Figure 4:
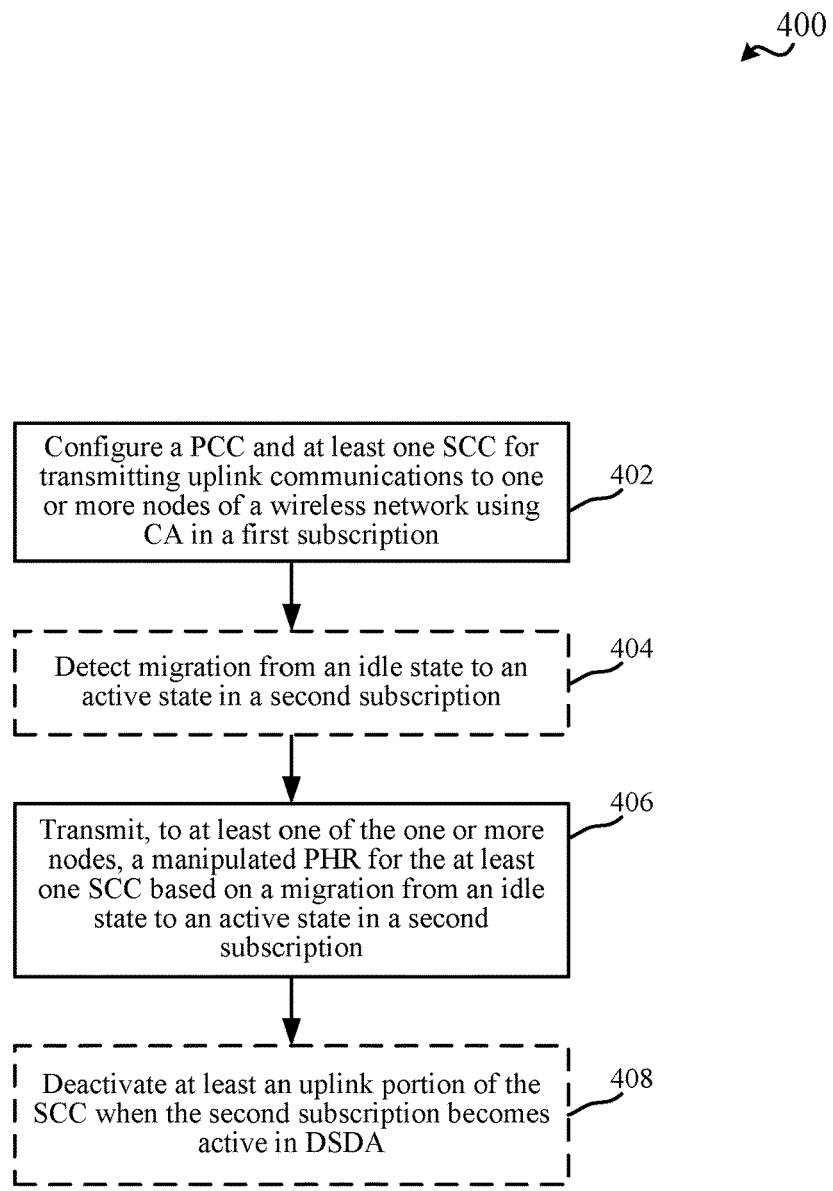
FIG. 4 is a flow chart illustrating an example of a method for sending a manipulated power headroom report (PHR), in accordance with aspects described herein.

Turning now to FIGS. 3-6, aspects are depicted with reference to one or more components and one or more methods that may perform the actions or operations described herein, where aspects in dashed line may be optional. Although the operations described below in FIG. 4 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for switching between standby and active multiple subscription modes and accordingly modifying CC configurations, as described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

In addition, memory 316 may include or may be coupled with or provide multiple SIMs 378 for providing each of multiple subscriptions. For example, UE 104 can include the multiple SIMs 378 as separate SIM cards that can be electronically coupled to the UE 104 (e.g., in SIM card slots), SIMs that are hardcoded in memory 316 or other portion of the UE 104, etc. The UE 104 can use the multiple SIMs 378 for communicating using multiple subscriptions, such as DSDS or DSDA modes, as described herein. Thus, for example, the UE 104 can use one SIM 378 for communicating with one or more cells over one or more CCs, and/or another SIM 378 for communicating with one or more other cells over one or more other CCs. In one example, the UE 104 can use one SIM 378 for communicating using one radio access technology (RAT) (e.g., LTE), and/or another SIM 378 for communicating using another RAT (e.g., NR).

Transceiver 302 may include at least one receiver 306 and at least one transmitter 308. Receiver 306 may include hardware and/or software executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102 or a SL transmitting UE. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware and/or software executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, receiving wireless communications transmitted by at least one base station 102 or a SL transmitting UE, transmitting wireless communications to at least one base station 102 or a SL receiving UE, etc. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102, one or more other UEs in SL communications, etc. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a subscription mode component 352 for managing operations in a certain subscription mode, such as DSDS mode or DSDA mode, and facilitating switching between modes, and/or a PHR component 354 for transmitting PHRs for one or more CCs, as described further herein.

In an aspect, the processor(s) 312 may correspond to one or more of the processors described in connection with the UE in FIG. 6. Similarly, the memory 316 may correspond to the memory described in connection with the UE in FIG. 6.

FIG. 4 illustrates a flow chart of an example of a method 400 for sending a manipulated PHR, in accordance with aspects described herein. In an example, a UE 104 can perform the functions described in method 400 using one or more of the components described in FIGS. 1 and 3.

In method 400, at Block 402, a PCC and at least one SCC can be configured for transmitting uplink communications to one or more nodes of a wireless network using CA in a first subscription. In an aspect, UE communicating component 342, e.g., in conjunction with processor(s) 312, memory 316, transceiver 302, etc., can configure the PCC and the at least one SCC for transmitting uplink communications to one or more nodes of the wireless network using CA in the first subscription. For example, the one or more nodes of the wireless network may include a base station 102 or gNB 180, a component of a disaggregated base station 102 or gNB 180, etc. In an example, UE communicating component 342 can configure the PCC and the at least one SCC using a first subscription (e.g., associated with a first SIM of SIMs 378). Moreover, in an example, UE communicating component 342 can manage a network stack for each of multiple RATs that can be used in communicating using each of multiple subscriptions.

In a specific example, the UE 104 can communicate with one or more network nodes over a PCC and SCC using a first subscription in LTE. UE communicating component 342, in this example, can manage an LTE network stack to facilitate the communications using LTE. The UE 104 can communicate using LTE in standalone mode or in DSDS mode, where only one subscription is in active mode at a time (and the other subscription(s) is/are in idle mode). In examples described herein, the UE 104 can also communicate using NR (e.g., in DSDS mode) as a second subscription (e.g., associated with a second SIM of SIMs 378 or the same SIM as the first subscription). In this example, UE communicating component 342 can manage an NR network stack as well to facilitate the communications using NR. As described above, in an example, UE communicating component 342 can configure multiple CCs for communicating using LTE, which can include multiple UL CCs and/or multiple DL CCs.

In method 400, optionally at Block 404, migration from an idle state to an active state in a second subscription can be detected. In an aspect, subscription mode component 352, e.g., in conjunction with processor(s) 312, memory 316, transceiver 302, UE communicating component 342, etc., can detect the migration from the idle state to the active state in the second subscription. For example, subscription mode component 352 can detect the migration based on detecting a switch from DSDS mode to DSDA mode, or one or more events that may indicate a planned or imminent switch attempt from DSDS mode to DSDA mode. In one example, subscription mode component 352 can detect the migration based on detecting a random access channel (RACH) procedure initiated on the second subscription.

In a specific example, when NR goes from idle to connected or activate state, the NR stack may send or initiate a config_start_cb to the LTE stack. This message may be detected as an indication of the migration. For example, UE communicating component 342 may detect, at layer 1 (L1) of the LTE stack, the config_start_cb from L1 of the NR stack. At the time the config_start_cb is received, subscription mode component 352 has not yet entered connected or active state on the NR subscription. In other examples, subscription mode component 352 may be otherwise notified of the migration (e.g., via monitoring activity of the NR stack, based on receiving certain messages via the NR stack, such as paging messages, etc.).

In method 400, at Block 406, a manipulated PHR for the at least one SCC can be transmitted to at least one of the one or more nodes based on a migration from an idle state to an active state in a second subscription. In an aspect, PHR component 354, e.g., in conjunction with processor(s) 312, memory 316, transceiver 302, UE communicating component 342, etc., can transmit, to at least one of the one or more nodes, the manipulated PHR for the at least one SCC based on the migration from the idle state to the active state in the second subscription. In one example, the manipulated PHR can include a certain PHR value regardless of an actual measured PHR, such as a lowest possible PHR value or PHR index (e.g., PH0). Using the manipulated value may allow PHR component 354 to indicate, to the network node, that there is no (or very low) power headroom for transmitting over the at least one SCC.

For PUSCH channel, for example, the Power Headroom reporting procedure is used to provide the serving base station with information about the difference between the nominal UE maximum transmit power and the estimated power for UL-shared channel (SCH) transmission. PHR report mapping is provided in third generation partnership project (3GPP) technical specification (TS) 36.133. A PHR report mapping table includes various indices each indicating a range of measured quality value (in decibels). For example, a large index from the table can indicate a that there is enough room for UE to increase transmit power, whereas a small index can indicate that UE is short of transmit power for transmitting communications over the corresponding CC. The PHR can enable the UE to impact network scheduling in this regard. Reporting small PHR may result in the network reducing or eliminating UL traffic over a corresponding CC. Under ULCA, in accordance with examples described herein, the UE can report two PHRs, one for each CC, which can facilitate SCC PHR manipulation while PCC PHR can stay the same, as described herein.

In addition, for example, PHR component 354 can transmit PHR based on a configuration. One example of a PHR configuration can include one or more of a periodic timer, prohibit timer, or downlink pathloss change criterion. For example, the periodic timer can indicate when PHR is to occur, and PHR component 354 can transmit the manipulated PHR based on the periodic timer. In another example, the prohibit timer can prevent PHR from occurring until the prohibit timer is expired, and PHR component 354 may not transmit the manipulated PHR until the prohibit timer expires. The downlink pathloss change criterion can allow the UE to initiate a PHR report when DL pathloss goes beyond a threshold. By exploring DL pathloss change criterion, PHR component 354 can send the manipulated PHR report for the at least one SCC on the basis that it is triggered by a large DL pathloss change if the prohibit timer expires. In some examples, such as where oldPHR=5, dl-PathlossChange=dB6, even setting SCC PHR to PH0 may not meet the downlink pathloss change criterion. Under these scenarios, PHR component 354 can bypass sending PHR, and/or can send PHR when a UL grant is scheduled for the SCC.

In one example, PHR component 354 can transmit the PHR for the at least one SCC based on subscription mode component 352 being notified of or otherwise detecting the migration from the idle state to the active state in the second subscription (e.g., as described in Block 404). For example, as described, subscription mode component 352 can detect the migration based on detecting activation of DSDA mode, or actions related to activating DSDA mode. In one example, PHR component 354 can transmit the PHR for the at least one SCC after LTE L1 is notified of NR going from idle to RACH via config_start_cb. In an example, PHR component 354 can transmit the PHR (e.g., initiate a PHR report) in a next available UL grant, where the UL grant may be for the PCC or SCC. Moreover, for example, PHR component 354 can report normal PHR for the PCC regardless of the migration, as the PCC can remain for UL communications in DSDA mode. Transmitting the manipulated PHR for the at least one second SCC, for example, can result in the network node shifting some UL traffic away from the SCC, which can smooth the transition from ULCA to single UL PCC in DSDA. An example is shown in FIG. 5.

Figure 5:
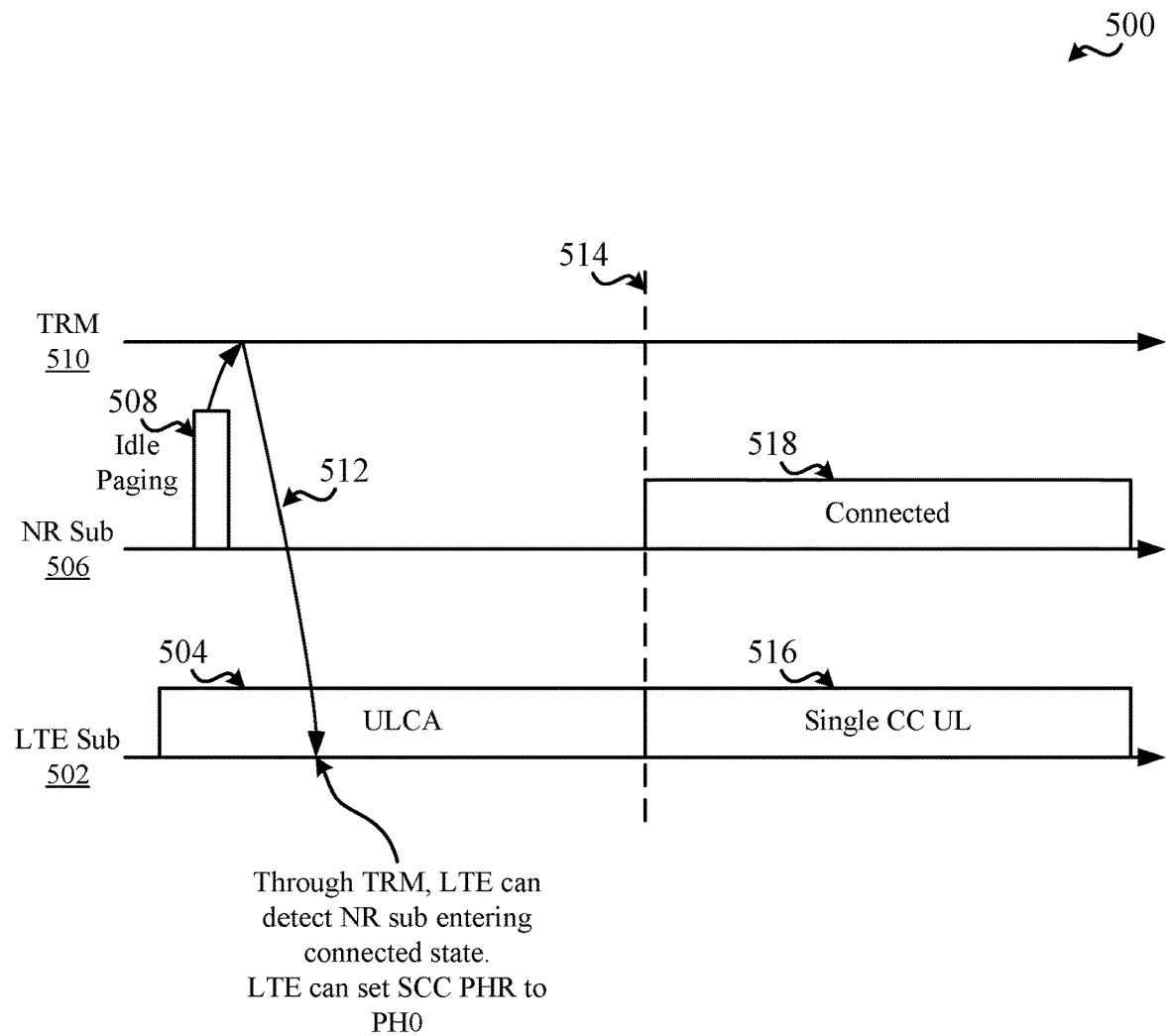
FIG. 5 illustrates an example of a timeline for sending a manipulated PHR, in accordance with various aspects of the present disclosure.

FIG. 5 illustrates a timeline 500 for activating DSDA based on multiple UE subscriptions, in accordance with aspects described herein. In timeline 500, an LTE subscription 502 of a UE can operate in ULCA 504 to transmit UL communications in LTE using CA. In this example, the NR subscription 506 may be in an idle state during the time period of ULCA 504. An paging signal 508 can be received over the NR subscription 506 when in the idle state, and the NR subscription 506 can notify a transport resource manager (TRM) 510 of the UE, which can manage communications over the NR subscription 506 and the LTE subscription 502. Through the TRM 510, the LTE subscription 502 (or L1 of LTE stack, as described) can detect the NR subscription 506 entering a connected state (e.g., based on detecting config-_start_cb). The LTE subscription 502 can accordingly set the SCC PHR to PH0, and the SCC PHR of PH0 can be reported on the next control information communication in the LTE subscription 502 (e.g., in a physical uplink control channel (PUCCH) or physical uplink shared channel (PUSCH) control information communication over PCC or SCC). This may cause the network node to shift traffic from the SCC in LTE to the PCC, which can remain active after DSDA.

At 514, the UE can enter DSDA mode. In the meantime between detecting the NR subscription entering the connected state at 512 and entering DSDA mode at 514, the network node may shift the SCC traffic to PCC to avoid using the SCC based on the PHR for the SCC. When the UE enters DSDA mode at 514, the subscription mode component 352 can deactivate the UL SCC so that the LTE subscription 502 uses a single CC UL (e.g., the PCC) at 516, and can communicate over the NR subscription 506 in connected mode at 518. In an example, as described, if the UE cannot stay in DSDA mode for some reason (e.g., due to NR RACH failure, which may be performed as part of entering DSDA mode) or if the transition to DSDA mode is for a short period of time, the UE may send a normal PHR for the SCC (or otherwise terminate manipulation of the PHR) in an attempt to continue UL communications over at least the UL portion of the SCC.

In method 400, optionally at Block 408, at least an uplink portion of the SCC can be deactivated when the second subscription becomes active in DSDA. In an aspect, subscription mode component 352, e.g., in conjunction with processor(s) 312, memory 316, transceiver 302, UE communicating component 342, etc., can, where an UL grant for the SCC is received, deactivate at least the uplink portion of the SCC when the second subscription becomes active in DSDA (e.g., when the second subscription migrates to the active state in DSDA). For example, this can indicate that the network node is allocating resources for the UL SCC despite the manipulated PHR, and thus subscription mode component 352 can deactivate the UL SCC where DSDA mode is active. In another example, subscription mode component 352 can deactivate the SCC once DSDA mode is active regardless of whether an UL grant for SCC is received.

Figure 6:
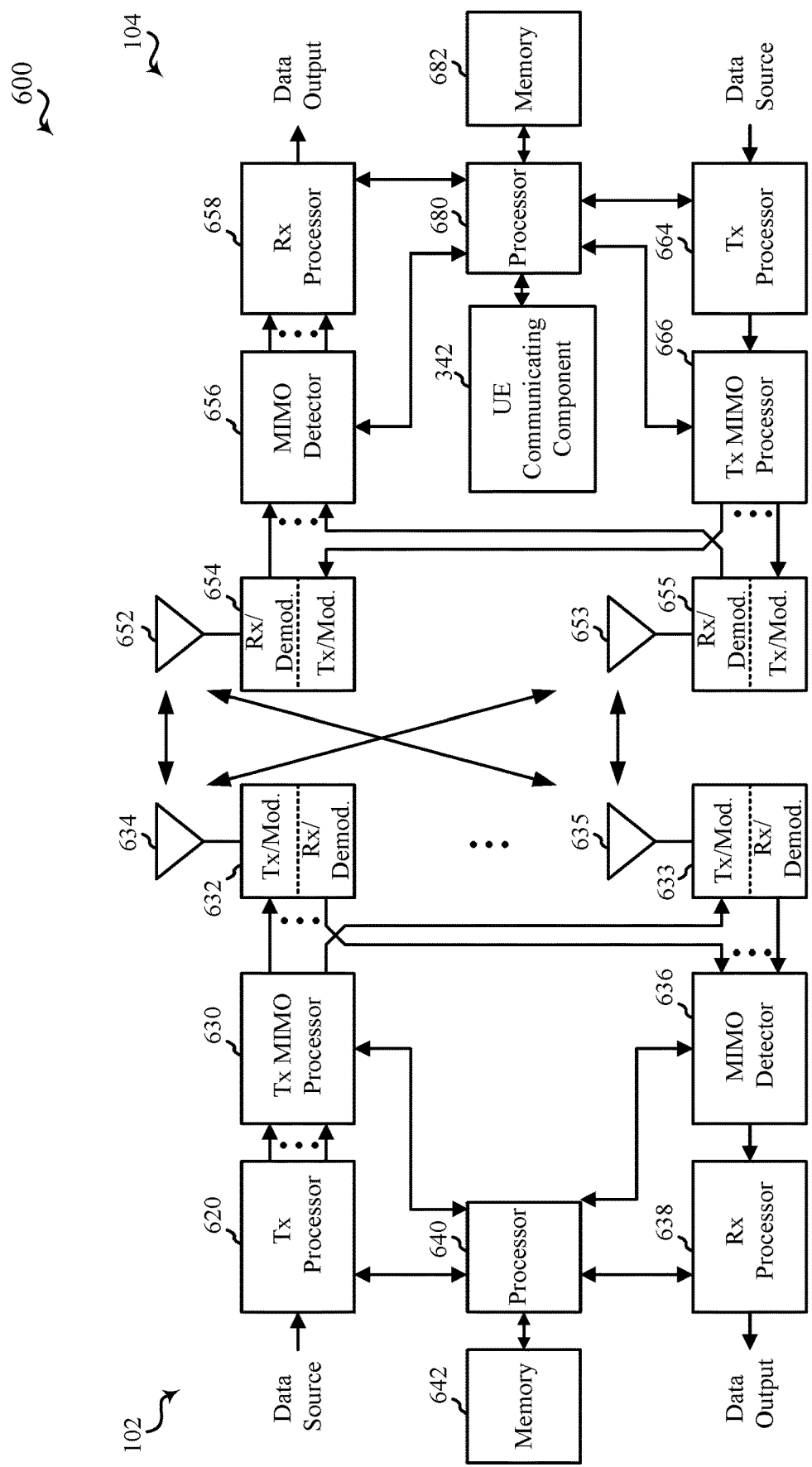
FIG. 6 is a block diagram illustrating an example of a multiple-input multiple-output (MIMO) communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a UE communicating component 342 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communications at a UE including configuring a PCC and at least one SCC for transmitting uplink communications to one or more nodes of a wireless network using CA in a first subscription of the UE, and transmitting, to at least one of the one or more nodes, a manipulated power headroom report for the at least one SCC based on a migration from an idle state to an active state in a second subscription of the UE.

In Aspect 2, the method of Aspect 1 includes where transmitting the manipulated power headroom report includes transmitting, for the at least one SCC, a lowest indication of power headroom regardless of an actual power headroom of the UE.

In Aspect 3, the method of any of Aspects 1 or 2 includes where transmitting the manipulated power headroom report includes transmitting the manipulated power headroom report in resources indicated in an uplink grant for the PCC or the SCC.

In Aspect 4, the method of any of Aspects 1 to 3 includes detecting the migration from the idle state to the active state in the second subscription based at least in part on detecting a random access channel procedure performed in the second subscription.

In Aspect 5, the method of any of Aspects 1 to 4 includes detecting the migration from the idle state to the active state in the second subscription based at least in part on detecting a paging signal received in the second subscription.

In Aspect 6, the method of any of Aspects 1 to 5 includes deactivating at least an uplink portion of the SCC when the second subscription migrates to the active state in DSDA.

In Aspect 7, the method of any of Aspects 1 to 6 includes transmitting, to at least one of the one or more nodes, a normal power headroom report for the at least one SCC based on a migration from the active state to the idle state in the second subscription of the UE.

In Aspect 8, the method of any of Aspects 1 to 7 includes where migration from the idle state to the active state in the second subscription of the UE includes activating a dual-subscription dual-active mode to concurrently communicate in the active state for the first subscription and the second subscription.

Aspect 9 is an apparatus for wireless communication including a transceiver, a memory configured to store instructions, and one or more processors communicatively coupled with the memory and the transceiver, wherein the one or more processors are configured to perform one or more of the methods of any of Aspects 1 to 8.

Aspect 10 is an apparatus for wireless communication including means for performing one or more of the methods of any of Aspects 1 to 8.

Aspect 11 is a computer-readable medium including code executable by one or more processors for wireless communications, the code including code for performing one or more of the methods of any of Aspects 1 to 8.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to:
   configure a primary component carrier (PCC) and at least one secondary component carrier (SCC) for transmitting uplink communications to one or more nodes of a wireless network using carrier aggregation (CA) in a first subscription of the apparatus;
   detect a migration from an idle state to an active state in a second subscription based at least in part on a random access channel procedure initiated in the second subscription; and
   transmit, to at least one of the one or more nodes by using the first subscription and based on the migration from the idle state to the active state in the second subscription of the apparatus, a manipulated power headroom report for the at least one SCC.

2. The apparatus of claim 1, wherein the one or more processors are configured to transmit the manipulated power headroom report at least in part by transmitting, for the at least one SCC, a lowest indication of power headroom regardless of an actual power headroom of the apparatus.

3. The apparatus of claim 1, wherein the one or more processors are configured to transmit the manipulated power headroom report in resources indicated in an uplink grant for the PCC or the SCC.

4. The apparatus of claim 1, wherein the one or more processors are further configured to detect the migration from the idle state to the active state in the second subscription based at least in part on detecting a paging signal received in the second subscription.

5. The apparatus of claim 1, wherein the one or more processors are further configured to deactivate at least an uplink portion of the SCC when the second subscription migrates to the active state in dual subscription dual active (DSDA).

6. The apparatus of claim 1, wherein the one or more processors are further configured to transmit, to at least one of the one or more nodes, a normal power headroom report for the at least one SCC based on a migration from the active state to the idle state in the second subscription of the apparatus.

7. The apparatus of claim 1, wherein migration from the idle state to the active state in the second subscription of the apparatus includes activating a dual-subscription dual-active mode to concurrently communicate in the active state for the first subscription and the second subscription.

8. A method for wireless communications at a user equipment (UE), comprising:
configuring a primary component carrier (PCC) and at least one secondary component carrier (SCC) for transmitting uplink communications to one or more nodes of a wireless network using carrier aggregation (CA) in a first subscription of the UE;
detecting a migration from an idle state to an active state in a second subscription based at least in part on a random access channel procedure initiated in the second subscription; and
transmitting, to at least one of the one or more nodes by using the first subscription and based on the migration from the idle state to the active state in the second subscription of the UE, a manipulated power headroom report for the at least one SCC.

9. The method of claim 8, wherein transmitting the manipulated power headroom report includes transmitting, for the at least one SCC, a lowest indication of power headroom regardless of an actual power headroom of the UE.

10. The method of claim 8, wherein transmitting the manipulated power headroom report includes transmitting the manipulated power headroom report in resources indicated in an uplink grant for the PCC or the SCC.

11. The method of claim 8, further comprising detecting the migration from the idle state to the active state in the second subscription based at least in part on detecting a paging signal received in the second subscription.

12. The method of claim 8, further comprising deactivating at least an uplink portion of the SCC when the second subscription migrates to the active state in dual subscription dual active (DSDA).

13. The method of claim 8, further comprising transmitting, to at least one of the one or more nodes, a normal power headroom report for the at least one SCC based on a migration from the active state to the idle state in the second subscription of the UE.

14. The method of claim 8, wherein migration from the idle state to the active state in the second subscription of the UE includes activating a dual-subscription dual-active mode to concurrently communicate in the active state for the first subscription and the second subscription.

15. An apparatus for wireless communications, comprising:
means for configuring a primary component carrier (PCC) and at least one secondary component carrier (SCC) for transmitting uplink communications to one or more nodes of a wireless network using carrier aggregation (CA) in a first subscription of the apparatus;
means for detecting a migration from an idle state to an active state in a second subscription based at least in part on a random access channel procedure initiated in the second subscription; and
means for transmitting, to at least one of the one or more nodes by using the first subscription and based on the migration from the idle state to the active state in the second subscription of the apparatus, a manipulated power headroom report for the at least one SCC.

16. The apparatus of claim 15, wherein the means for transmitting transmits, for the at least one SCC, a lowest indication of power headroom regardless of an actual power headroom of the apparatus.

17. The apparatus of claim 15, wherein transmitting transmits the manipulated power headroom report in resources indicated in an uplink grant for the PCC or the SCC.

18. The apparatus of claim 15, further comprising means for detecting the migration from the idle state to the active state in the second subscription based at least in part on detecting a paging signal received in the second subscription.

19. The apparatus of claim 15, further comprising means for deactivating at least an uplink portion of the SCC when the second subscription migrates to the active state in dual subscription dual active (DSDA).

20. The apparatus of claim 15, further comprising means for transmitting, to at least one of the one or more nodes, a normal power headroom report for the at least one SCC based on a migration from the active state to the idle state in the second subscription of the apparatus.

21. A non-transitory computer-readable medium comprising code executable by one or more processors for wireless communications at a user equipment (UE), the code comprising code for:
configuring a primary component carrier (PCC) and at least one secondary component carrier (SCC) for transmitting uplink communications to one or more nodes of a wireless network using carrier aggregation (CA) in a first subscription of the UE;
detecting a migration from an idle state to an active state in a second subscription based at least in part on a random access channel procedure initiated in the second subscription; and
transmitting, to at least one of the one or more nodes by using the first subscription and based on the migration from the idle state to the active state in the second subscription of the UE, a manipulated power headroom report for the at least one SCC.

22. The non-transitory computer-readable medium of claim 21, wherein the code for transmitting transmits, for the at least one SCC, a lowest indication of power headroom regardless of an actual power headroom of the UE.

23. The non-transitory computer-readable medium of claim 21,
wherein transmitting transmits the manipulated power headroom report in resources indicated in an uplink grant for the PCC or the SCC.

24. The non-transitory computer-readable medium of claim 21, further comprising code for detecting the migration from the idle state to the active state in the second subscription based at least in part on detecting a paging signal received in the second subscription.

25. The non-transitory computer-readable medium of claim 21, further comprising code for deactivating at least an uplink portion of the SCC when the second subscription migrates to the active state in dual subscription dual active (DSDA).

26. The non-transitory computer-readable medium of claim 21, further comprising code for transmitting, to at least one of the one or more nodes, a normal power headroom report for the at least one SCC based on a migration from the active state to the idle state in the second subscription of the UE.

* * * * *